United States Patent
Takeshita et al.

(10) Patent No.: US 11,460,417 B2
(45) Date of Patent: Oct. 4, 2022

(54) INSPECTING METHOD AND INSPECTION APPARATUS FOR MEMBRANEELECTRODE ASSEMBLY

(71) Applicants: TOYOTA JIDOSHA KABUSHIKI KAISHA, Toyota (JP); HITACHI HIGH-TECH SCIENCE CORPORATION, Tokyo (JP)

(72) Inventors: Shinya Takeshita, Toyota (JP); Toshiyuki Takahara, Gotemba (JP); Masaki Tatsumi, Gotemba (JP)

(73) Assignees: TOYOTA JIDOSHA KABUSHIKI KAISHA, Toyota (JP); HITACHI HIGH-TECH SCIENCE CORPORATION, Tokyo (JP)

( * ) Notice: Subject to any disclaimer, the term of this patent is extended or adjusted under 35 U.S.C. 154(b) by 33 days.

(21) Appl. No.: 17/183,739

(22) Filed: Feb. 24, 2021

(65) Prior Publication Data
US 2021/0262949 A1    Aug. 26, 2021

(30) Foreign Application Priority Data
Feb. 26, 2020   (JP) .............................. JP2020-030275

(51) Int. Cl.
| | | |
|---|---|---|
| *G01N 23/04* | (2018.01) | |
| *G01N 23/18* | (2018.01) | |
| *H01M 8/04664* | (2016.01) | |
| *H01M 8/1004* | (2016.01) | |
| *G01N 23/083* | (2018.01) | |
| *G01B 15/02* | (2006.01) | |
| *G01N 23/16* | (2018.01) | |

(52) U.S. Cl.
CPC .......... *G01N 23/18* (2013.01); *G01B 15/025* (2013.01); *G01N 23/04* (2013.01); *G01N 23/083* (2013.01); *H01M 8/04664* (2013.01); *H01M 8/1004* (2013.01); *G01N 23/16* (2013.01)

(58) Field of Classification Search
CPC ...... G01N 23/18; G01N 23/04; G01N 23/083; G01N 23/16; G01N 2223/652; G01B 15/025; H01M 8/04664; H01M 8/1004; Y02E 60/50
See application file for complete search history.

(56) References Cited

U.S. PATENT DOCUMENTS

2019/0145913 A1 * 5/2019 Fukuda .................. G01N 23/04
378/58

FOREIGN PATENT DOCUMENTS

JP    2017162745 A    9/2017

* cited by examiner

*Primary Examiner* — Kiho Kim
(74) *Attorney, Agent, or Firm* — Hunton Andrews Kurth LLP (57) ABSTRACT

A method of inspecting a membrane-electrode assembly includes obtaining an X-ray transmission image by applying X-rays to the membrane-electrode assembly, and determining whether a foreign matter having a size equal to or larger than a predetermined value is included in the membrane-electrode assembly, according to a brightness reduction amount in each pixel of the X-ray transmission image obtained, while referring to a correlative relationship between the size of the foreign matter measured in a planar direction of the membrane-electrode assembly, and the brightness reduction amount in the X-ray transmission image.

6 Claims, 8 Drawing Sheets

INSPECTING METHOD AND INSPECTION APPARATUS FOR MEMBRANEELECTRODE ASSEMBLY

INCORPORATION BY REFERENCE

The disclosure of Japanese Patent Application No. 2020-030275 filed on Feb. 26, 2020 including the specification, drawings and abstract is incorporated herein by reference in its entirety.

BACKGROUND

Technical Field

The disclosure relates to a method of inspecting a membrane-electrode assembly, and an inspection apparatus for the membrane-electrode assembly.

Description of Related Art

According to a technology disclosed in Japanese Unexamined Patent Application Publication No. 2017-162745 (JP 2017-162745 A), for example, in relation to a method of inspecting a membrane-electrode assembly for a fuel cell, it is particularly noted that X-rays are absorbed by catalyst particles included in an electrode material on an electrolyte membrane, and the amount of the catalyst particles carried on the electrolyte membrane is calculated based on the transmissivity of X-rays calculated from a difference between the irradiation intensity and detection intensity of the X-rays.

SUMMARY

In some cases, foreign matter, such as Fe particles, is introduced from production equipment into the membrane-electrode assembly. This disclosure provides an inspecting method and an inspection apparatus, which make it possible to promptly and accurately detect foreign matter included in the membrane-electrode assembly, using X-rays.

This disclosure is implemented in the following forms.

(1) According to a first aspect of the disclosure, a method of inspecting a membrane-electrode assembly is provided. The inspecting method includes obtaining an X-ray transmission image by applying X-rays to the membrane-electrode assembly, and determining whether a foreign matter having a size equal to or larger than a predetermined value is included in the membrane-electrode assembly, according to a brightness reduction amount in each pixel of the X-ray transmission image obtained, while referring to a correlative relationship between the size of the foreign matter measured in a planar direction of the membrane-electrode assembly, and the brightness reduction amount in the X-ray transmission image. According to this aspect, the presence or absence of foreign matter can be determined based on the brightness reduction amount, using the correlative relationship between the size of the foreign matter and the brightness reduction amount in each pixel of the X-ray transmission image. Thus, the foreign matter can be promptly detected by use of the X-rays.

(2) The inspecting method as described above may further include preparing a plurality of foreign matter samples having different sizes measured in the planar direction, obtaining the brightness reduction amount corresponding to each of the foreign matter samples, from the X-ray transmission image of each of the foreign matter samples, and obtaining the correlative relationship in advance, from the brightness reduction amount obtained, and the size of each of the foreign matter samples. With this method, the correlative relationship can be obtained in advance, and therefore, detection of foreign matter can be promptly accomplished.

(3) According to a second aspect of the disclosure, a method of inspecting a membrane-electrode assembly is provided. The inspecting method includes obtaining an X-ray transmission image by applying X-rays to the membrane-electrode assembly, obtaining a thickness of a foreign matter measured in a thickness direction of the membrane-electrode assembly, in each pixel of the X-ray transmission image, according to a brightness reduction amount in each pixel of the X-ray transmission image, while referring to a correlative relationship between the thickness of the foreign matter and the brightness reduction amount in the X-ray transmission image, and specifying a shape of an object imaged in the X-ray transmission image, using the thickness in each pixel, and determining whether the foreign matter is included in the membrane-electrode assembly, based on the shape. According to this aspect, the shape of the foreign matter can be specified based on the brightness reduction amount in each pixel, by using the correlative relationship between the thickness of the foreign matter and the brightness reduction amount in each pixel of the X-ray transmission image. Thus, the foreign matter can be accurately detected by use of the X-rays.

(4) The inspecting method as described above may further include preparing a plurality of foreign matter samples having different thicknesses measured in the thickness direction of the membrane-electrode assembly, obtaining the brightness reduction amount corresponding to each of the foreign matter samples, from the X-ray transmission image of each of the foreign matter samples, and obtaining the correlative relationship in advance, from the brightness reduction amount obtained, and the thickness of each of the foreign matter samples. With this method, the correlative relationship can be obtained in advance; therefore, detection of foreign matter can be promptly accomplished. This disclosure can also be implemented in various forms, such as an inspection system or inspection apparatus for a membrane-electrode assembly, and a method of producing a membrane-electrode assembly, other than the above aspects as the methods of inspecting the membrane-electrode assembly.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
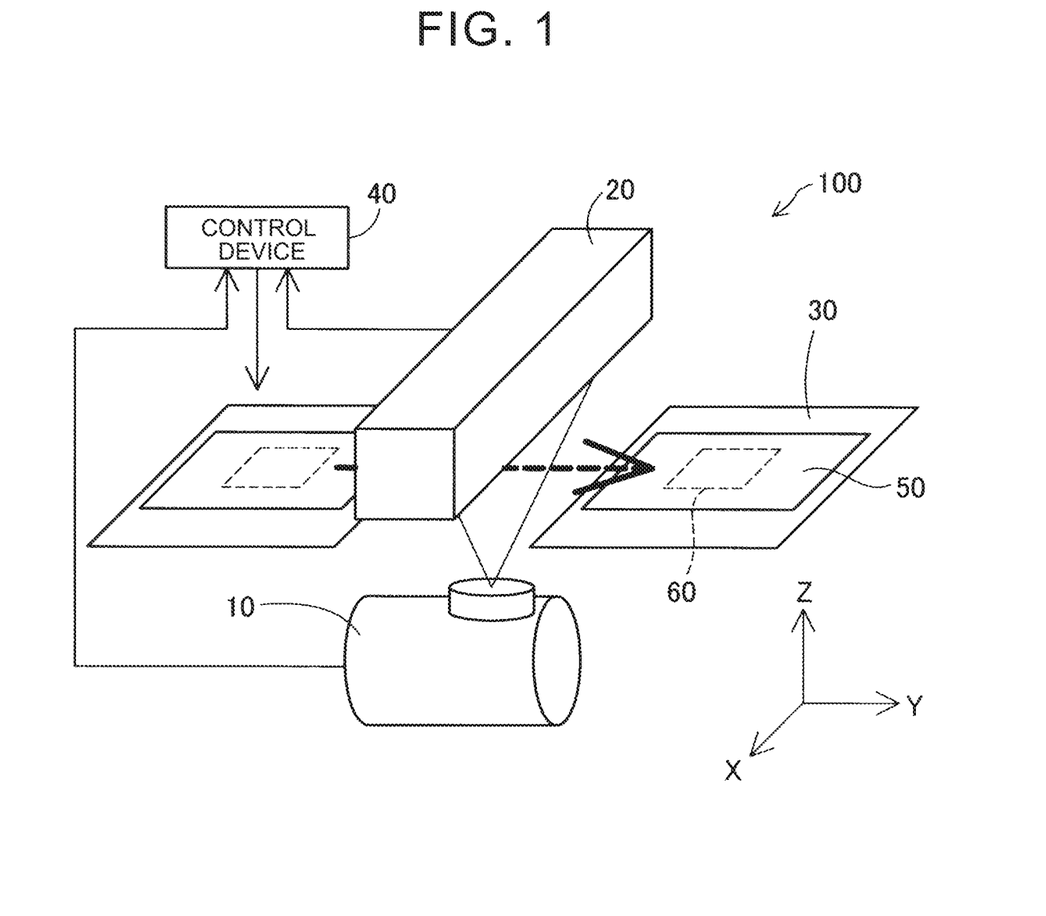
FIG. 1 is an explanatory view of an inspection system used for inspection of a membrane-electrode assembly.

FIG. 1 shows an inspection system 100 used for inspection of a membrane-electrode assembly. The inspection system 100 includes an X-ray source 10, detection camera 20, stage 30, and control device 40. A membrane-electrode assembly 50 is placed on the stage 30. In FIG. 1, the X, Y, Z directions, which are perpendicular to each other, are indicated. The Z direction is a thickness direction of the membrane-electrode assembly 50. The Y direction is a conveying direction of the stage 30. The X direction is perpendicular to the Y direction and the Z direction. The X direction and the Y direction are planar directions of the membrane-electrode assembly 50, and horizontal directions in this embodiment. Each direction shown in FIG. 2 and subsequent figures corresponds to each direction labelled with the same letter in FIG. 1. The inspection system 100 may also be called "inspection apparatus".

The X-ray source 10 emits X-rays toward the membrane-electrode assembly 50 placed on the stage 30. In this embodiment, an opening 60 is provided in the stage 30. The X-ray source 10 applies X-rays to the membrane-electrode assembly 50 from downside through the opening 60. As the X-ray source 10, a water-cooled or air-cooled X-ray tube may be used, for example, and the tube voltage may be set to 15 kV to 50 kV, while the tube current may be set to 0.1 mA to 35 mA.

The detection camera 20 is disposed to be opposed to the X-ray source 10 such that the stage 30 is interposed between the detection camera 20 and the X-ray source 10. In this embodiment, the detection camera 20 is oriented such that its downside faces the upper side of the stage 30. The detection camera 20 images the membrane-electrode assembly 50 irradiated with the X-rays, to capture an X-ray transmission image. The pixel resolution of the detection camera 20 is, for example, several dozens of μm per pixel. Also, the brightness resolution of the detection camera 20 is, for example, 8-bit to 32-bit grayscale. As the detection camera 20, a CCD (charge-coupled device) type or CMOS (complementary metal-oxide semiconductor) type linear image sensor or area image sensor may be used, for example. The image sensor may also be a TDI (time delay integration) type sensor.

The stage 30 is configured to be movable in a horizontal direction between the X-ray source 10 and the detection camera 20. The stage 30 includes a fixture (not shown) for fixing the membrane-electrode assembly 50 on the stage 30. The stage 30 is conveyed to move in the horizontal direction, by use of a moving device, such as a linear actuator or belt conveyor (not shown). The moving speed of the stage 30 is, for example, 40 mm/sec. or higher. A plurality of stages 30 may be prepared, and the stages 30 may successively move between the X-ray source 10 and the detection camera 20, so that inspection is continuously performed on a plurality of membrane-electrode assemblies 50.

The control device 40 is provided by a computer including a CPU and a memory, and controls the X-ray source 10, detection camera 20, and stage 30. The control device 40 performs inspection on the membrane-electrode assembly 50 to check foreign matter inclusion, according to the brightness value of each pixel in the X-ray transmission image obtained from the detection camera 20, referring to data stored in the memory and representing the correlative relationship between the dimension (size or thickness) of foreign matter, and the brightness value in the X-ray transmission image. The control device 40 corresponds to the "obtaining unit" and "determining unit" of the inspection apparatus.

The membrane-electrode assembly 50 has an electrolyte membrane, and catalyst electrode layers formed on opposite surfaces of the electrolyte membrane. The electrolyte membrane is a solid polymer membrane formed of a fluorinated sulfonic acid polymer, for example. The catalyst electrode layer consists of catalyst carrying carbon that carries catalyst particles, such as platinum, and an electrolyte resin, for example. In this embodiment, the inspection is conducted in a condition where a gas diffusion layer or layers provided by carbon paper, carbon nonwoven fabric, or the like, is/are disposed on one or both surfaces of the membrane-electrode assembly 50, and a frame member made of resin is fixed with an adhesive to the periphery of the membrane-electrode assembly 50. After the inspection, a pair of gas separators are disposed so as to sandwich the membrane-electrode assembly 50 in which no foreign matter was detected, and the frame member, so that a fuel cell is completed. The inspection of the membrane-electrode assembly 50 may be conducted in a condition where the frame member or gas diffusion layer is not disposed in position.

Figure 2:
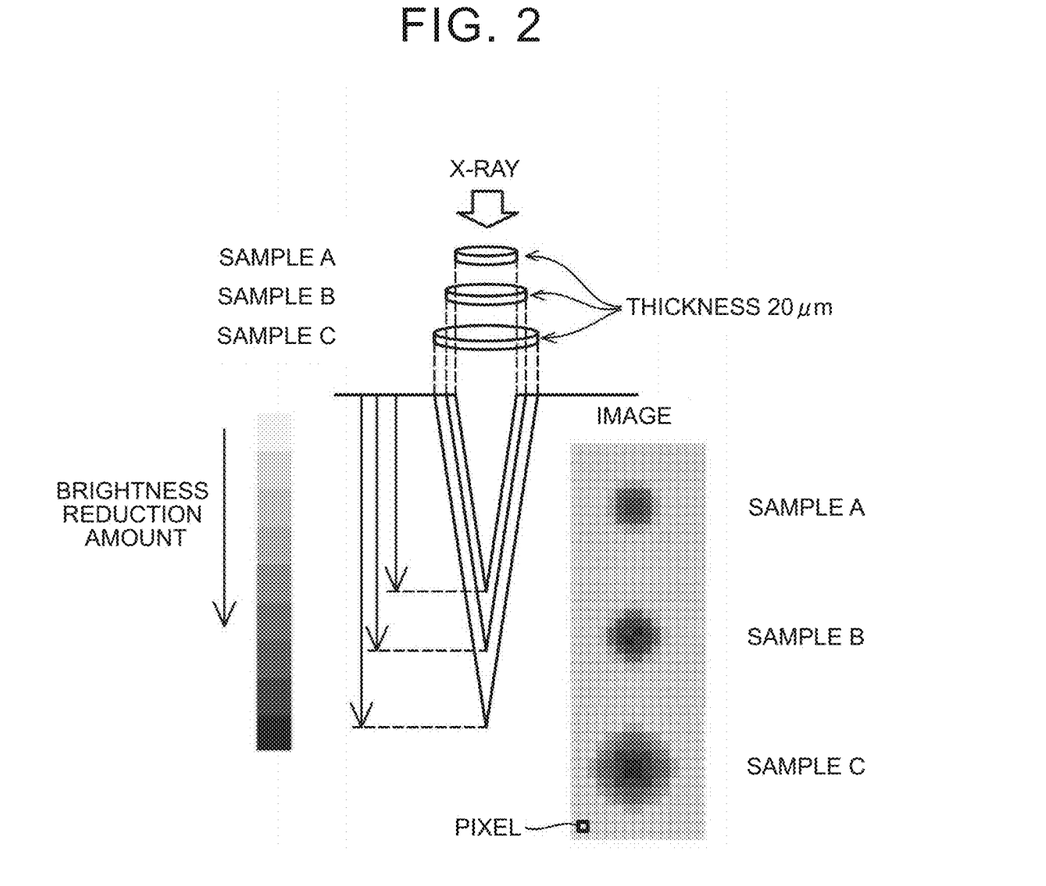
FIG. 2 is an explanatory view showing the principle of an inspecting method according to a first embodiment.

Referring to FIG. 2, the principle of the inspecting method according to the first embodiment will be described. Suppose foreign matter that absorbs X-rays was present in the membrane-electrode assembly 50. In this case, when the output of the X-ray source 10 was suitably adjusted, and the X-rays were applied to the membrane-electrode assembly 50, it was confirmed that a portion where the foreign matter was present was darkly imaged, and its brightness value was reduced, in the X-ray transmission image of the membrane-electrode assembly 50. Namely, in the portion where foreign matter is present in the X-ray transmission image, the amount of reduction of the brightness from the maximum brightness of the captured X-ray transmission image is increased. In the following description, the amount of reduction of the brightness from the maximum brightness of the X-ray transmission image will be simply called "brightness reduction amount".

When two or more foreign matter samples made of iron and having different sizes measured in the planar directions of the membrane-electrode assembly 50 (which will be simply called "foreign matter samples") were prepared, and X-ray transmission images of the samples were obtained, the brightness reduction amount at the center of the foreign matter in the X-ray transmission image changed according to the size of the foreign matter sample, as shown in FIG. 2.

Figure 3:
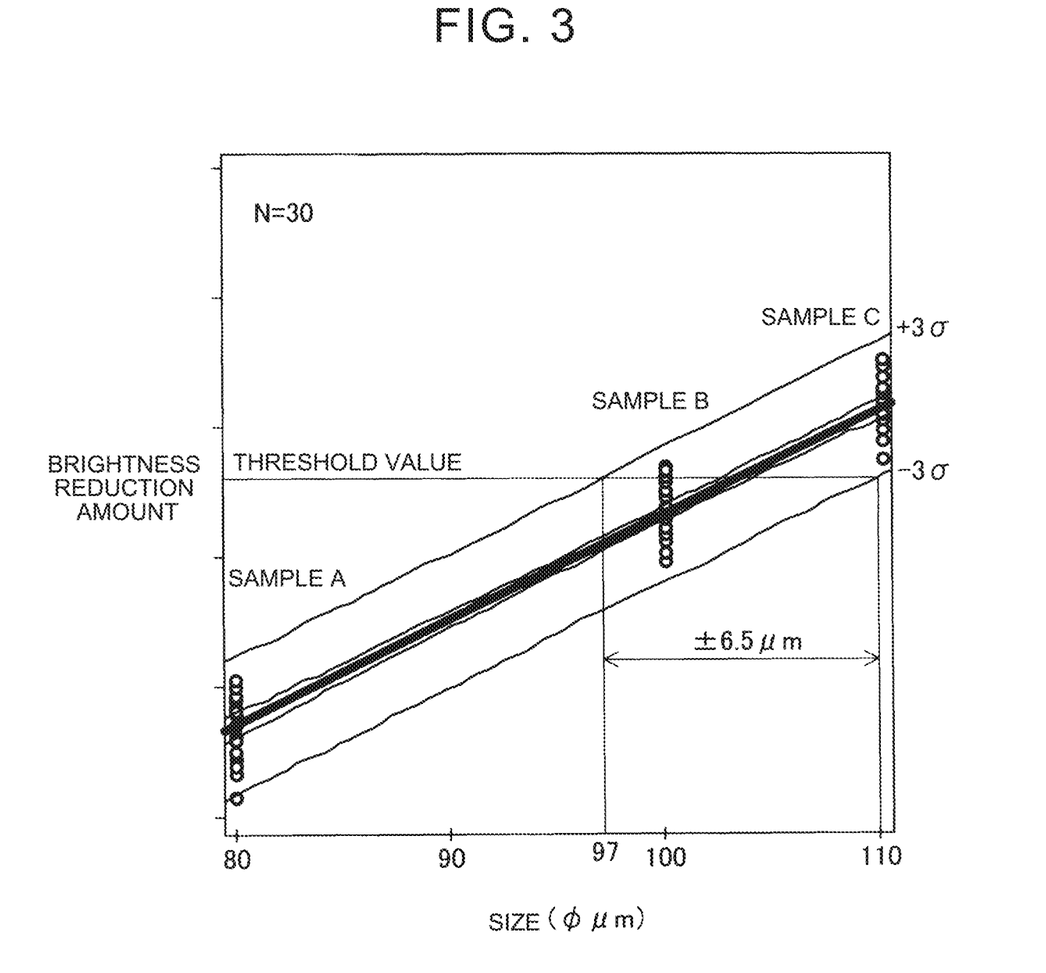
FIG. 3 is a graph showing the correlative relationship between the brightness reduction amount and the size of foreign matter.

FIG. 3 is a graph showing the correlative relationship between the brightness reduction amount and the size of the foreign matter. The horizontal axis of the graph shown in FIG. 3 indicates the size of the foreign matter, and the vertical axis indicates the brightness reduction amount. In this embodiment, the following three types of cylindrical foreign matter samples A, B, C were prepared, so as to check the relationship between the size of the foreign matter and the brightness reduction amount.

(1) Foreign matter sample A: thickness 20 μm, diameter 80 μm, material Fe
(2) Foreign matter sample B: thickness 20 μm, diameter 100 μm, material Fe
(3) Foreign matter sample C: thickness 20 μm, diameter 110 μm, material Fe When the X-ray transmission image of the membrane-electrode assembly 50 including each foreign matter sample was obtained 30 times for each sample by a system similar to the inspection system 100 shown in FIG. 1, it was found that there is a strong correlative relationship between the size of the foreign matter sample, and the brightness reduction amount in the darkest portion of the X-ray transmission image, as shown in FIG. 3. More specifically, the above test provided a result that the brightness reduction amount in the X-ray transmission image linearly increases as the size of the foreign matter sample becomes larger. A straight line indicated by a thick line in FIG. 3 is a regression line indicating the correlative relationship. According to the graph shown in FIG. 3, the linear correlative relationship is presumed to be established when the size of the foreign matter is in a general range equal to or larger than 40 μm, up to about 150 μm.

In FIG. 3, for each foreign matter sample, a zone (which will be called "3σ zone") of ±3σ (σ is a standard deviation) of the average of the brightness reduction amounts is obtained, and a belt-like range passing the zones of the respective samples is indicated. When the brightness reduction amount is fixed, the width of the belt-like range along the horizontal axis is 13 μm. Namely, the size of the foreign matter for one brightness value can vary within a range of ±6.5 μm. This range is smaller than a range (±several dozens of μm) of the size of the foreign matter when it is measured based on the pixel size (several dozens of μm) of the X-ray transmission image captured by the detection camera 20, and the measurement accuracy is improved by about 70%.

In the first embodiment, the lower limit of the 3σ zone of the brightness reduction amount of the foreign matter sample C having a diameter of 110 μm is set as a threshold value, and it is determined whether foreign matter is included in the membrane-electrode assembly 50, depending on whether the brightness reduction amount is larger than the threshold value. Namely, in the first embodiment, it is determined whether foreign matter that is equal to or larger than a predetermined size (diameter 110 μm) is included in the membrane-electrode assembly 50, according to the brightness reduction amount as brightness information obtained from the X-ray transmission image, and the threshold value obtained from the correlative relationship shown in FIG. 3. The threshold value is not limited to the lower limit of the 3σ zone, but may be the lower limit of a 2σ zone, or the lower limit of a 6σ zone. Also, the correlative relationship between the size of foreign matter and the brightness reduction amount may be obtained using a significant number of foreign matter samples having different sizes, and the threshold value may be statistically obtained so that the false detection rate of foreign matter becomes equal to or lower than a desired rate.

Figure 4:
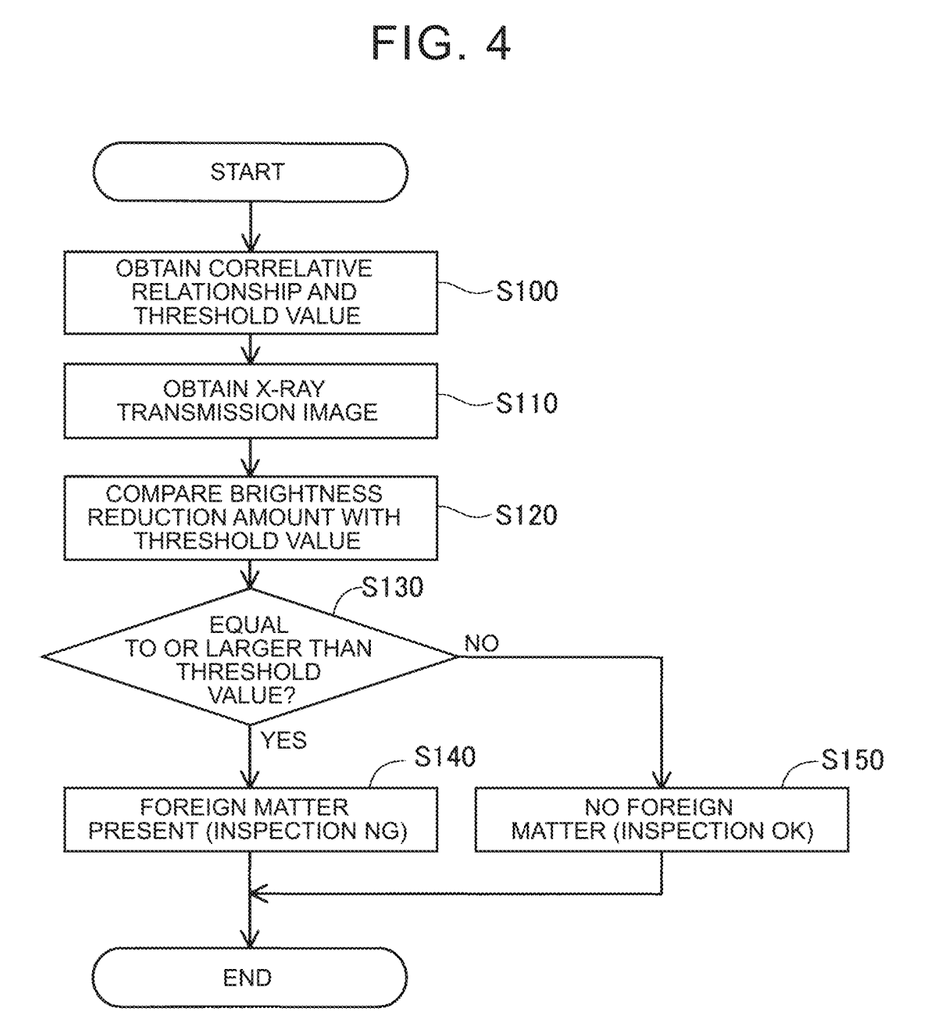
FIG. 4 is a flowchart illustrating the method of inspecting the membrane-electrode assembly according to the first embodiment.

FIG. 4 is a flowchart illustrating the method of inspecting the membrane-electrode assembly 50, which is carried out in the first embodiment. Initially, in step S100, foreign matter samples are prepared, as described above using FIG. 2 and FIG. 3, the correlative relationship between the sizes of the samples and the brightness reduction amounts is obtained, and the threshold value as shown in FIG. 3 is obtained. The data representing the thus obtained correlative relationship and the threshold value are stored in the memory of the control device 40. The operation in step S100 may be performed in advance, before the inspecting method is carried out.

In step S110, the control device 40 controls the X-ray source 10, detection camera 20, and stage 30, and applies X-rays to the membrane-electrode assembly 50, to obtain an X-ray transmission image. The process of step S110 will be called "obtaining step".

In step S120, the control device 40 compares the brightness reduction amount of each pixel in the X-ray transmission image, with the threshold value obtained in step S100.

In step S130, the control device 40 determines whether there is a pixel of which the brightness reduction amount is equal to or larger than the threshold value, in the X-ray transmission image. When there is one or more pixels of which the brightness reduction amount is equal to or larger than the threshold value, the control device 40 determines in step S140 that foreign matter having the predetermined size or larger size is included in the membrane-electrode assembly 50 (INSPECTION NG). On the other hand, when there is no pixel of which the brightness reduction amount is equal to or larger than the threshold value, the control device 40 determines in step S150 that there is no foreign matter having the predetermined size or larger size in the membrane-electrode assembly 50 (INSPECTION OK). The process of steps S120 to S150 will be called "determining step". In step S130, in order to reduce an influence of noise, a group of pixels having brightness reduction amounts equal to or larger than a predetermined value may be extracted from the X-ray transmission image, and the determinations in step S140 and step S150 may be made, based on the brightness reduction amount of a pixel having the smallest brightness value, among the group of pixels. The control device 40 may output the determination result in the determining step, via an output device, such as a display device, which is connected to the control device 40.

Once the inspection result as described above is obtained in the inspection system 100, a fuel cell is produced, using the membrane-electrode assembly 50 determined as "INSPECTION OK", namely, the membrane-electrode assembly 50 in which it was determined that there is no foreign matter. The flowchart shown in FIG. 4 represents the process of inspection on a single membrane-electrode assembly 50. Thus, by repeatedly executing the obtaining process of step S110 and the determining process of steps S120 to S150, the inspection can be successively conducted on a plurality of membrane-electrode assemblies 50.

In the method of inspecting the membrane-electrode assembly 50 according to the first embodiment as described above, the correlative relationship between the size of foreign matter and the brightness reduction amount in the X-ray transmission image is obtained in advance, and it is determined whether any foreign matter having the predetermined size or larger size is included in the membrane-electrode assembly 50, based on the correlative relationship and the brightness reduction amount in each pixel of the X-ray transmission image. Thus, the presence or absence of foreign matter can be promptly determined, based on only the brightness values of the pixels in the X-ray transmission image.

Also, in the first embodiment, the use of the correlative relationship between the size of foreign matter and the brightness value in the X-ray transmission image makes it possible to determine the size of foreign matter with a resolution that is smaller than the size of one pixel in the X-ray transmission image. Thus, foreign matter in the membrane-electrode assembly 50 can be accurately detected, with accuracy that exceeds the pixel resolution of the detection camera 20.

In the first embodiment, in steps S130 to S150 of FIG. 4, the presence or absence of foreign matter is determined directly from the brightness reduction amount, by comparing the brightness reduction amount obtained from the X-ray transmission image with the threshold value. On the other hand, the size of foreign matter included in the X-ray transmission image may be obtained, from the brightness reduction amount obtained from the X-ray transmission image, based on the correlative relationship shown in FIG. 3, and the presence or absence of foreign matter may be determined, by comparing the size thus obtained, with a predetermined threshold value.

B. Second Embodiment

Figure 5:
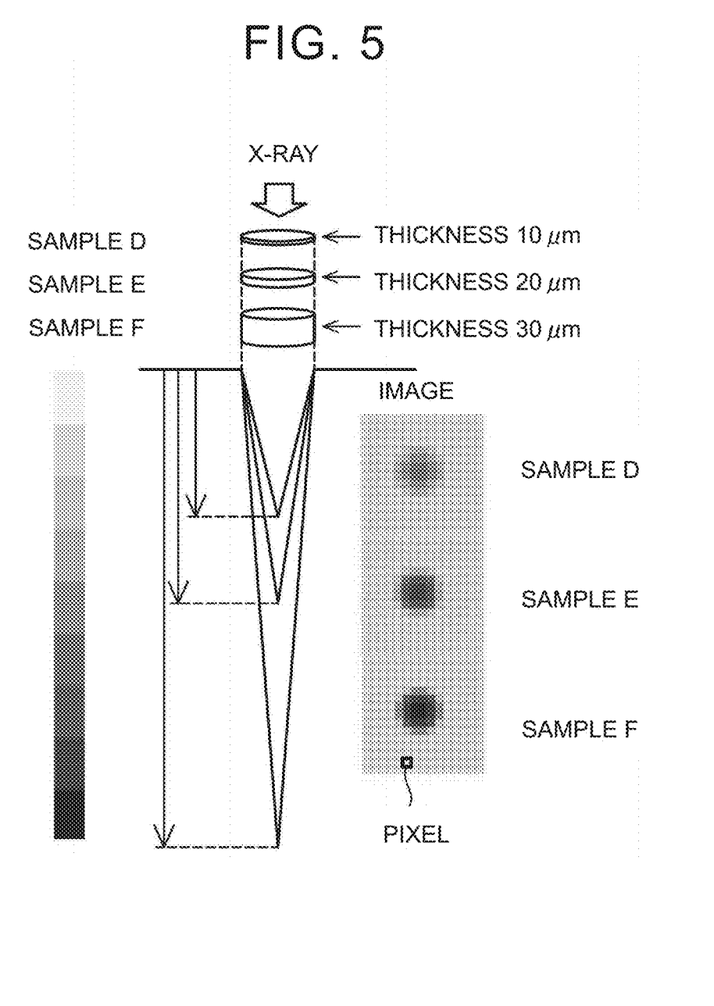
FIG. 5 is an explanatory view showing the principle of an inspecting method according to a second embodiment.

Referring to FIG. 5, the principle of an inspecting method according to a second embodiment will be described. The configuration of the inspection system 100 according to the second embodiment is identical with that of the first embodiment. In the first embodiment, the presence or absence of foreign matter is determined based on the correlative relationship between the size of foreign matter in the planar directions of the membrane-electrode assembly 50 and the brightness reduction amount. In the second embodiment, on the other hand, the presence or absence of foreign matter is determined, based on the correlative relationship between the thickness of the foreign matter measured in the thickness direction of the membrane-electrode assembly 50 and the brightness reduction amount.

When a plurality of foreign matter samples made of iron and having different dimensions (which will be simply called "thickness") along the thickness direction of the membrane-electrode assembly 50 was prepared, and X-ray transmission images of the samples were obtained, the brightness reduction amount at the center of foreign matter in the X-ray transmission image changed according to the thickness of the foreign matter sample, as shown in FIG. 5.

Figure 6:
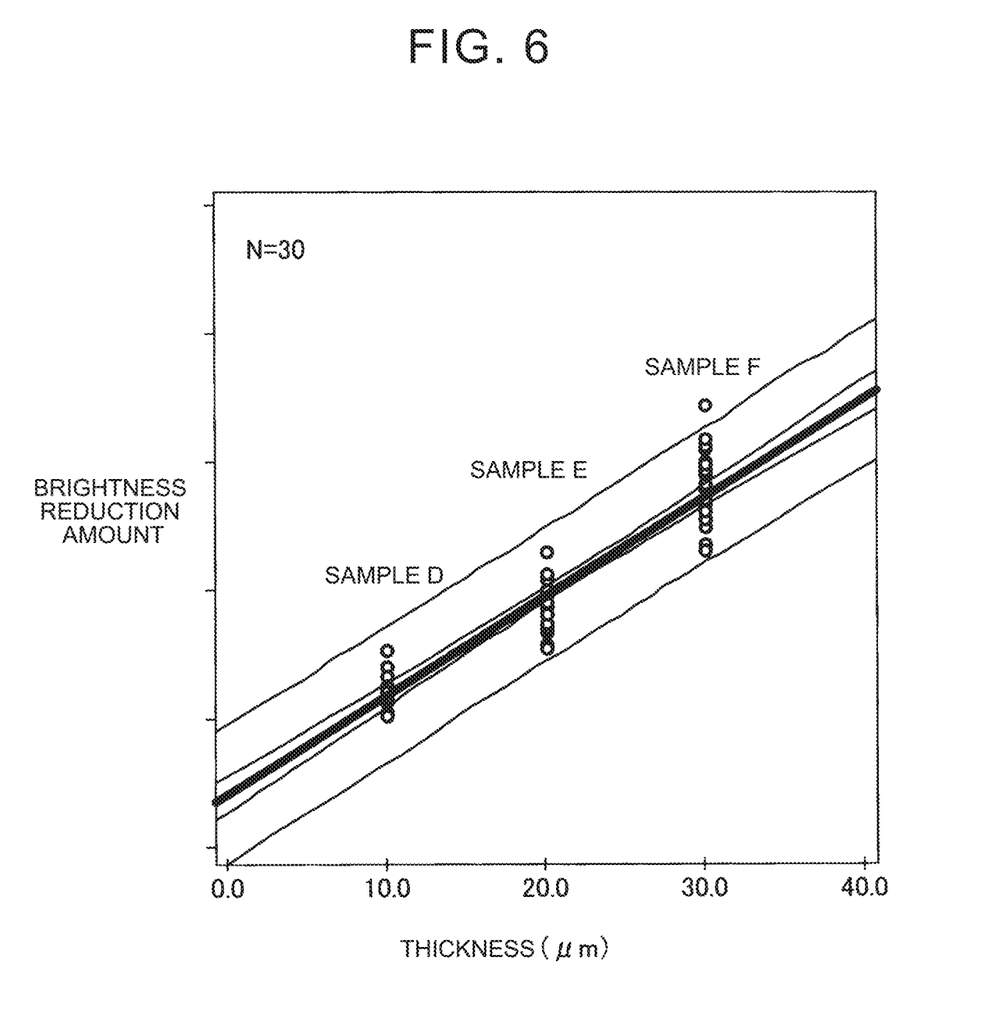
FIG. 6 is a graph showing the correlative relationship between the brightness reduction amount and the thickness of foreign matter.

FIG. 6 is a graph showing the correlative relationship between the brightness reduction amount and the thickness of foreign matter. In the graph shown in FIG. 6, the horizontal axis indicates the thickness of the foreign matter, and the vertical axis indicates the brightness reduction amount. In this embodiment, three types of cylindrical foreign matter samples D, E, F as follows were prepared, so as to check the relationship between the thickness of the foreign matter and the brightness reduction amount.

(1) Foreign matter sample D: thickness 10 μm, diameter 100 μm, material Fe
(2) Foreign matter sample E: thickness 20 μm, diameter 100 μm, material Fe
(3) Foreign matter sample F: thickness 30 μm, diameter 100 μm, material Fe When the X-ray transmission image of the membrane-electrode assembly 50 including each foreign matter sample was obtained 30 times for each sample by a system similar to the inspection system 100 shown in FIG. 1, it was found that there is a strong correlative relationship between the thickness of the foreign matter sample, and the brightness reduction amount in the darkest portion of the X-ray transmission image, as shown in FIG. 6. More specifically, the above test provided a result that the brightness reduction amount in the X-ray transmission image linearly increases as the thickness of the foreign matter sample becomes larger. A straight line indicated by a thick line in FIG. 6 is a regression line indicating the correlative relationship. In the second embodiment, it is determined whether foreign matter is included in the membrane-electrode assembly 50, by using a linear function representing the regression line.

Figure 7:
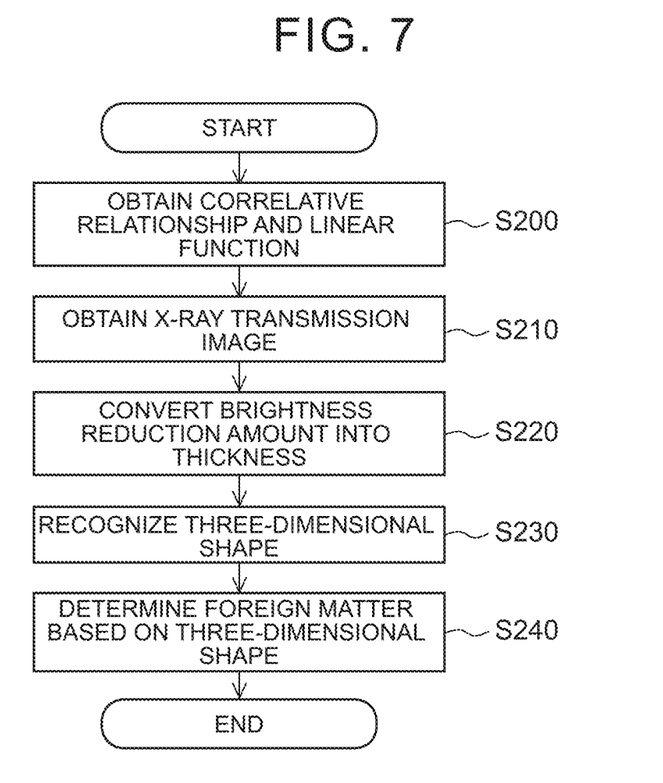
FIG. 7 is a flowchart illustrating the method of inspecting the membrane-electrode assembly according to the second embodiment.

FIG. 7 is a flowchart illustrating the method of inspecting the membrane-electrode assembly 50, which is carried out in the second embodiment. Initially, in step S200, foreign matter samples are prepared, as described above using FIG. 5 and FIG. 6, the correlative relationship between the thicknesses of the samples and the brightness reduction amounts is obtained, and the linear function as indicated in FIG. 6 is obtained. The data representing the thus obtained correlative relationship, threshold value, and the linear function are stored in the memory of the control device 40. The operation in step S200 may be performed in advance, before the inspecting method is carried out.

Figure 8:
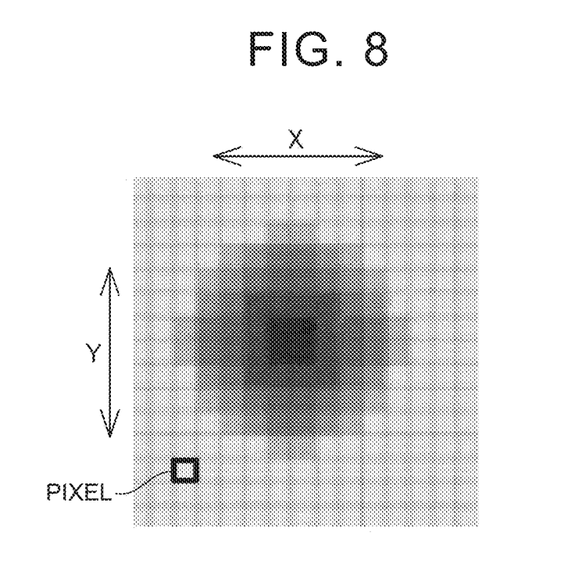
FIG. 8 is a view showing an example of an X-ray transmission image obtained.

In step S210, the control device 40 controls the X-ray source 10, detection camera 20, and stage 30, and applies X-rays to the membrane-electrode assembly 50, to obtain an X-ray transmission image. FIG. 8 shows an example of the X-ray transmission image thus obtained.

Figure 9:
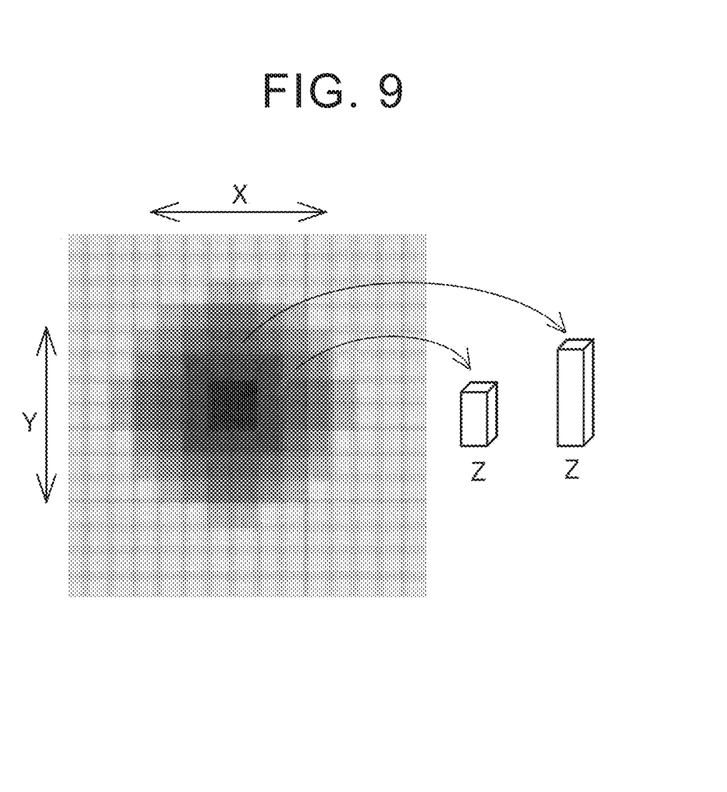
FIG. 9 is a view showing the manner of converting the brightness reduction amount of a part of pixels of the X-ray transmission image into the thickness.

In step S220, the control device 40 converts the brightness reduction amount of each pixel of the X-ray transmission image thus obtained, into the thickness, using the linear function obtained in step S200. In step S220, the control device 40 preferably converts the brightness reduction amount into the thickness of foreign matter, only with respect to the pixels of which the brightness reduction amounts are equal to or larger than a predetermined value, so as to remove noise caused by small brightness reduction amounts. FIG. 9 schematically shows the manner of converting the brightness reduction amounts of a part of pixels of the X-ray transmission image shown in FIG. 8, into the thicknesses.

Figure 10:
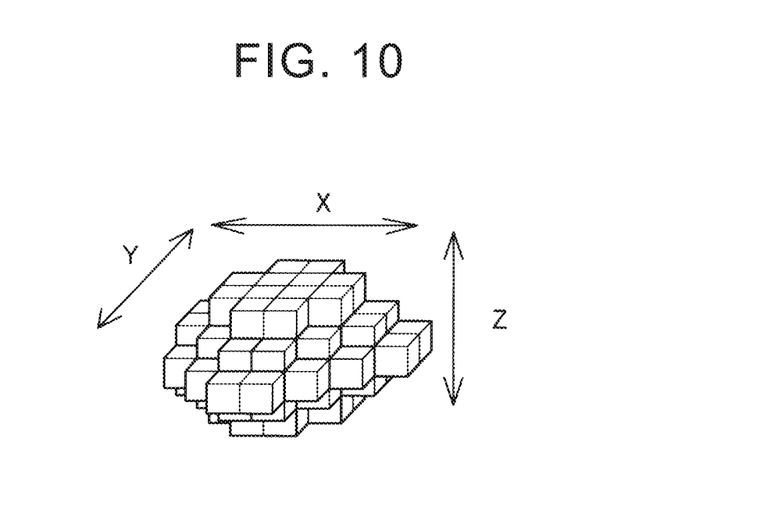
FIG. 10 is a view showing the manner of stereoscopically recognizing the shape of an object.

In step S230, the control device 40 stereoscopically recognizes the shape of an object imaged in the X-ray transmission image, based on the value of the thickness of each pixel obtained in step S220. FIG. 10 schematically shows the manner of stereoscopically recognizing the shape of the object. The process of step S220 and step S230 will be called "shape specifying process".

In step S240, the control device 40 determines the presence or absence of foreign matter, based on the stereoscopically recognized shape of the object. The process of step S240 will be called "determining process". In step S240, the volume or surface area of the stereoscopically recognized shape is calculated, and the presence or absence of foreign matter is determined by comparing the value of the volume or surface area with a predetermined threshold value. The presence or absence of foreign matter may also be determined by comparing a pattern representing the shape of foreign matter, with the stereoscopically recognized shape, by a method, such as pattern matching, for example. The flowchart shown in FIG. 7 represents the process of inspection on a single membrane-electrode assembly 50. Thus, by repeatedly executing the obtaining process of step S210, the shape specifying process of steps S220 to S230, and the determining process of step S240, the inspection can be successively conducted on a plurality of membrane-electrode assemblies 50. The control device 40 may output the determination result obtained in the determining process, via an output device, such as a display device, connected to the control device 40.

In the method of inspecting the membrane-electrode assembly 50 according to the second embodiment as described above, the correlative relationship between the thickness of foreign matter and the brightness reduction amount in the X-ray transmission image is obtained in advance, and the thickness in each pixel is obtained, from the correlative relationship and the brightness reduction amount in each pixel of the X-ray transmission image, so that the shape of the object imaged in the X-ray transmission image is specified. Then, it is determined, based on the shape, whether foreign matter is included in the membrane-electrode assembly 50. Thus, the shape of foreign matter can be specified based on only the brightness values obtained from the X-ray transmission image; therefore, foreign matter can be detected with high accuracy, using the X-rays.

Also, in the second embodiment, the shape close to the actual shape of foreign matter can be specified by obtaining the thickness of the foreign matter in each pixel of the X-ray transmission image. Thus, even when a rod-like foreign matter is present obliquely in the membrane-electrode assembly 50, or is present perpendicularly to the planar directions, for example, and the apparent size in the planar directions of the membrane-electrode assembly 50 is small, highly accurate detection can be performed.

C. Other Embodiments (C-1) In the illustrated embodiments, the presence or absence of foreign matter is determined, using the amount of brightness reduction from the maximum brightness in the captured X-ray transmission image. On the other hand, the presence or absence of foreign matter may be determined, using the amount of brightness reduction from the maximum value in a range that can cover the brightness values. Also, the brightness value may be used as it is, as the brightness reduction amount. In this case, the brightness reduction amount is larger as the brightness value is smaller.

(C-2) In the illustrated embodiments, the size or thickness of foreign matter has a linear relationship with the brightness reduction amount. However, the relationship is not limited to the linear relationship, but may be any correlative relationship, such as a non-linear relationship. For example, the regression line described in the above embodiments may be a regression curve.

(C-3) In the first embodiment, the "size" of foreign matter as a criterion for determination on foreign matter inclusion is specified by diameter. However, the "size" can be specified, using various indexes, such as an area measured in the planar directions of the membrane-electrode assembly 50, the maximum dimension in the planar directions, and the product of the major axis and minor axis in the planar directions. For example, as the size of a foreign matter sample, any of the above-indicated indexes may be employed, according to the shape often observed in actual foreign substances, so that the correlative relationship can be obtained with higher accuracy.

This disclosure is not limited to the above embodiments, but may be implemented with various arrangements, without departing from the principle of the disclosure. For example, technical features in the embodiments, which correspond to technical features in each of the forms described in the "SUMMARY", may be replaced or combined as appropriate, so as to solve a part or the whole of the above problems, or to achieve a part or the whole of the above effects. When the technical features are not described as being essential in this specification, they may be deleted as appropriate.

What is claimed is:

1. A method of inspecting a membrane-electrode assembly, comprising:
    obtaining an X-ray transmission image by applying X-rays to the membrane-electrode assembly; and
    determining whether a foreign matter having a size equal to or larger than a predetermined value is included in the membrane-electrode assembly, according to a brightness reduction amount in each of pixels of the X-ray transmission image obtained, while referring to a correlative relationship between the size of the foreign matter measured in a planar direction of the membrane-electrode assembly, and the brightness reduction amount in the X-ray transmission image.

2. The method according to claim 1, further comprising:
    preparing a plurality of foreign matter samples having different sizes measured in the planar direction;
    obtaining the brightness reduction amount corresponding to each of the foreign matter samples, from the X-ray transmission image of each of the foreign matter samples; and
    obtaining the correlative relationship in advance, from the brightness reduction amount obtained, and the size of each of the foreign matter samples.

3. A method of inspecting a membrane-electrode assembly, comprising:
    obtaining an X-ray transmission image by applying X-rays to the membrane-electrode assembly;
    obtaining a thickness of a foreign matter measured in a thickness direction of the membrane-electrode assembly, in each of pixels of the X-ray transmission image, according to a brightness reduction amount in each of the pixels of the X-ray transmission image, while referring to a correlative relationship between the thickness of the foreign matter and the brightness reduction amount in the X-ray transmission image, and specifying a shape of an object imaged in the X-ray transmission image, using the thickness in each of the pixels; and
    determining whether the foreign matter is included in the membrane-electrode assembly, based on the shape.

4. The method according to claim 3, further comprising:
    preparing a plurality of foreign matter samples having different thicknesses measured in the thickness direction of the membrane-electrode assembly;
    obtaining the brightness reduction amount corresponding to each of the foreign matter samples, from the X-ray transmission image of each of the foreign matter samples; and
    obtaining the correlative relationship in advance, from the brightness reduction amount obtained, and the thickness of each of the foreign matter samples.

5. An inspection apparatus for a membrane-electrode assembly, comprising:
    an obtaining unit configured to obtain an X-ray transmission image by applying X-rays to the membrane-electrode assembly; and
    a determining unit configured to determine whether a foreign matter having a size equal to or larger than a predetermined value is included in the membrane-electrode assembly, according to a brightness reduction amount in each of pixels of the X-ray transmission image obtained by the obtaining unit, while referring to a correlative relationship between the size of the foreign matter measured in a planar direction of the membrane-electrode assembly, and the brightness reduction amount in the X-ray transmission image.

6. An inspection apparatus for a membrane-electrode assembly, comprising:
- an obtaining unit configured to obtain an X-ray transmission image by applying X-rays to the membrane-electrode assembly; and
- a determining unit configured to obtain a thickness of a foreign matter measured in a thickness direction of the membrane-electrode assembly, in each of pixels of the X-ray transmission image, according to a brightness reduction amount in each of the pixels of the X-ray transmission image obtained by the obtaining unit, while referring to a correlative relationship between the thickness of the foreign matter and the brightness reduction amount in the X-ray transmission image,
- specify a shape of an object imaged in the X-ray transmission image, using the thickness in each of the pixels, and
- determine whether the foreign matter is included in the membrane-electrode assembly, based on the shape.

* * * * *